June 21, 1938.　　　　W. F. EAMES　　　　2,121,588
MOTOR CONTROL SYSTEM
Filed Jan. 16, 1937　　　2 Sheets-Sheet 1

WITNESSES:
Michael Stark
G. O. Harrison

INVENTOR
William F. Eames
BY
ATTORNEY

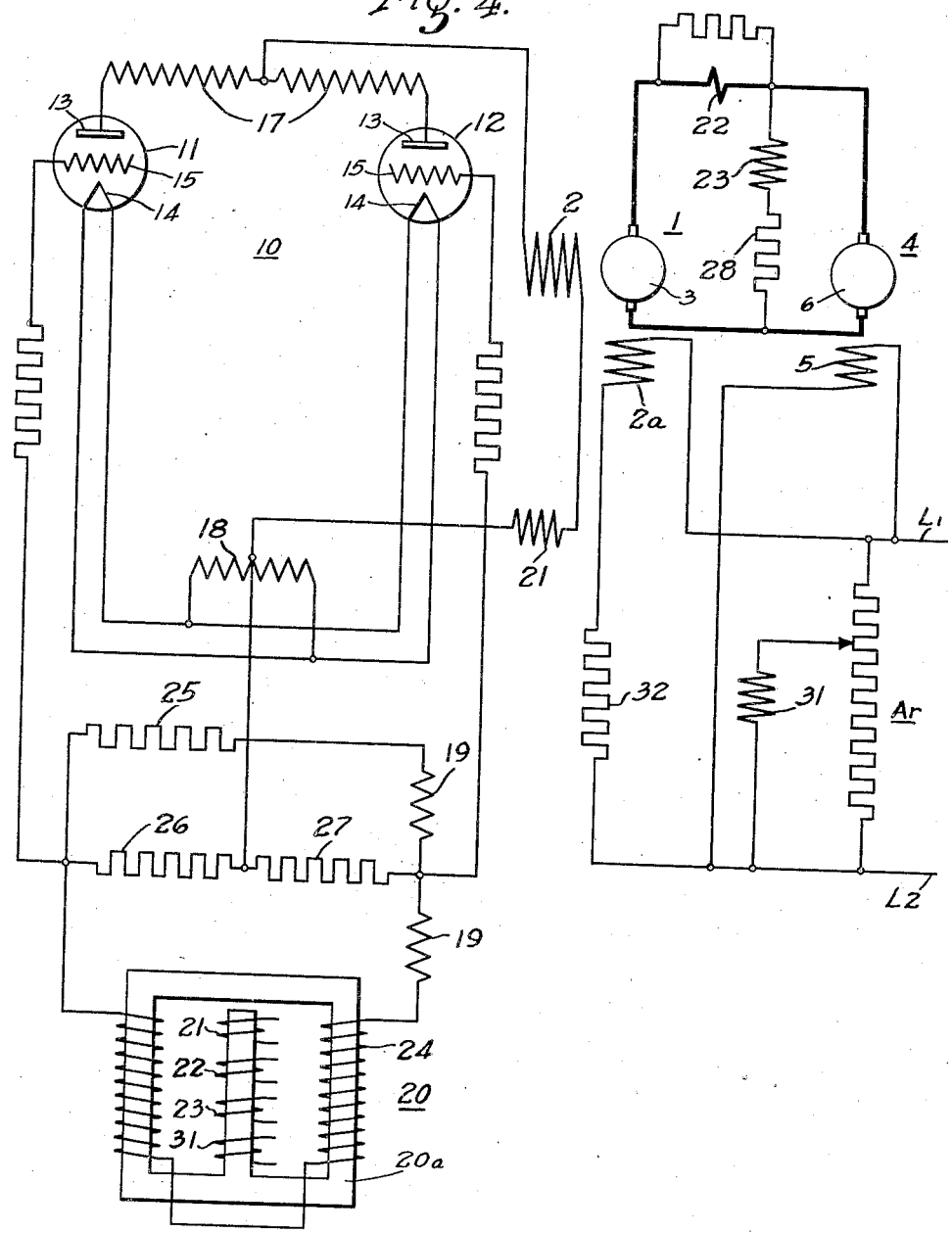

Patented June 21, 1938

2,121,588

UNITED STATES PATENT OFFICE 2,121,588

MOTOR CONTROL SYSTEM

William F. Eames, Edgewood, Pa., assignor to Westinghouse Electric Elevator Company, Chicago, Ill., a corporation of Illinois Application January 16, 1937, Serial No. 120,919

17 Claims. (Cl. 172—239)

My invention relates to motor control systems of the variable-voltage or Ward-Leonard type, and particularly to a novel form of speed-regulating apparatus for controlling the speed of the motor in such systems. In a recently-perfected form of speed-regulating apparatus for such systems, a balanced Wheatstone bridge circuit is provided for combining two components of generator field current in such a manner that neither current component produces any resistance voltage drop in the external circuit of the other current component. One external circuit is controlled by the rheostatic device commonly provided for varying the motor speed, and the other external circuit is supplied by means of a regulating generator which corrects the effects of load variables on the motor speed. Because of the balanced Wheatstone bridge relationship, interchange of energy between the two external circuits is prevented, and each external circuit produces its effect upon the motor speed independently of the other external circuit.

In the above-mentioned form of speed-regulating apparatus, the regulating generator is excited in accordance with the difference between the actual speed of the motor and the speed corresponding to the setting of the rheostatic device, in order to produce fast regulating action in accordance with known principles. In order to prevent hunting of the regulating apparatus, the actual value of current in the main generator field winding is taken as the measure of the speed corresponding to the setting of the rheostatic device.

Although the above-described regulating apparatus is rapid in operation and extremely accurate, it requires a continuously-operating auxiliary motor-generator set for eliminating the effect of load variables. I have found that the operating advantages of the system as a whole may be retained, the first cost of the system reduced, and the auxiliary motor-generator set eliminated, if a novel arrangement of electronic apparatus is provided for controlling the main generator excitation.

It is, accordingly, an object of my invention to provide a novel electronic speed regulator for the motors of variable-voltage or Ward-Leonard control systems.

A further object of my invention is to provide electronic regulating apparatus of novel type, suitable for application to variable voltage motor-control systems, for the regulation of any desired operating characteristic.

Other objects of my invention will become evident from the following detailed description taken in conjunction with the accompanying drawings, in which:

Fig. 4 is a diagrammatic view of a modification of the system shown in Fig. 1.

Figure 1:
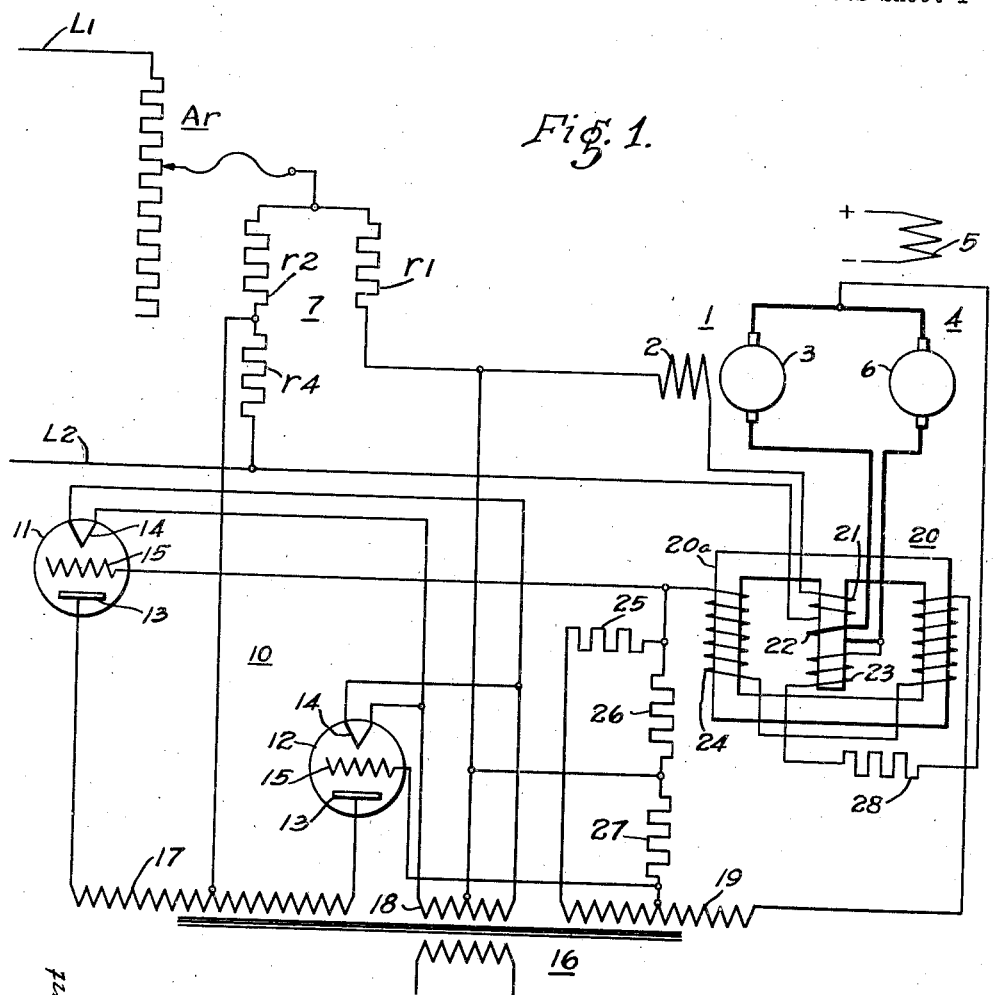
Figure 1 is a diagrammatic view of a variable-voltage motor control system embodying my invention.

Referring to Fig. 1, the variable-voltage motor control system comprises a first dynamo-electric machine 1 having a field winding 2 and an armature 3, and a second dynamo-electric machine 4 having a field winding 5 and an armature 6. The dynamo-electric machine 1 is driven at substantially constant speed by any suitable means (not shown) such as an alternating-current induction motor, and serves as a variable-voltage generator to supply the second dynamo-electric machine 4, which operates with constant excitation as a variable-speed motor.

Field current for the generator 1 is supplied by means of a Wheatstone bridge circuit 7 having four arms consisting of three resistors $r1$, $r2$ and $r4$, and a circuit which includes the field winding 2. The resistance values in the Wheatstone bridge circuit 7 are so related that $$\frac{R_1}{R_2} = \frac{R_3}{R_4}$$

where
$R_1$ = resistance of resistor $r1$
$R_2$ = resistance of resistor $r2$
$R_3$ = total resistance of the bridge arm which includes the field winding 2
$R_4$ = resistance of resistor $r4$.

One pair of junction points of the Wheatstone bridge circuit 7 is connected to a pair of constant voltage direct-current supply conductors $L1$, $L2$, in series with a rheostatic device $A_r$; and the diagonally opposite pair of junctions is connected to the anode-cathode circuit of suitable electronic apparatus 10, shown as consisting of a pair of electronic devices 11 and 12 of the thyratron or grid-glow type.

The electronic devices 11 and 12 may be of any of a number of types known in the art, but for purposes of illustration will be assumed as gas-filled tubes of the type which becomes unidirectionally conducting in response to energization of a control element to a predetermined degree during the half cycle of supply voltage when the anode is positive with reference to the cathode, and of remaining conducting until approximately the instant of current zero in the ensuing discharge, at which instant the anode and cathode are at approximately the same potential. The function of the control element in rendering the anode-cathode path conducting at a predetermined point in the voltage wave, may be carried out in accordance with various principles known in the art, but it will be assumed that the control element is a voltage responsive electrode in the discharge path, and the principle of operation is that of a thyratron or grid-glow tube.

Each of the electronic devices 11 and 12 consists of a sealed envelope having a gaseous medium therein, such as mercury vapor, argon or neon, and each device is provided with an anode 13, a cathode 14, and a control electrode 15.

The electronic devices 11 and 12 are energized by means of a transformer 16, energized at constant voltage from an alternating-current source, and having an anode-voltage winding 17, a cathode heating winding 18, and an excitation voltage winding 19. The three windings 17, 18 and 19 are each tapped at a mid-point, and each supplies a constant alternating voltage suitable for energization of the corresponding circuits of the electronic devices 11 and 12.

The excitation voltage winding 19 of the transformer 16 is connected to the control electrodes 15 by means of an excitation circuit comprising a resistor 25, a saturable reactor 20 and a pair of resistors 26 and 27 of equal resistance value. The junction point between the resistor 25 and the saturable reactor 20 is connected to the mid-tap of the excitation voltage winding 19 by means of the pair of resistors 26 and 27.

The saturable reactor 20 comprises an iron core 20a, upon which is mounted a control winding 21, a series type winding 22 and a shunt type winding 23. The three windings 21, 22 and 23 cooperate to control the degree of saturation of the iron core 20a and thereby to control the alternating-current reactance of an alternating-current winding 24. The control winding 21 is connected in series with the field winding 2 of the main generator 1, and together therewith makes up the resistance component $R_3$ of the Wheatstone bridge circuit 7. The series type winding 22 is connected in the main armature circuit of the generator 1 and motor 4, and serves to introduce a component of magnetomotive force dependent on the armature current of the motor 4. The shunt type winding 23 is connected across the armature circuit of the generator 1 and motor 4 in series with a current limiting resistor 28, to respond to the terminal voltage of the motor 4. The winding 24 is designed to have negligible resistance in comparison to the inductive reactance produced by the iron core 20a.

The series type winding 22 and the shunt type winding 23 are so designed that they produce together a magnetomotive force proportional at all times to the counter-electromotive force of the motor 4. Inasmuch as the counter-electromotive force of the motor 4 consists of the motor terminal voltage plus or minus the IR drop in the motor armature and brushes, the windings 22 and 23 are designed to produce magnetomotive forces bearing the same ratio as the armature and brush IR drop and the motor terminal voltage, respectively. The control winding 21 is so designed that for a change of current therein of one ampere, a voltage change will be produced in the cathode-anode circuit of the electronic devices 11 and 12 equal in volts to the sum of the resistances of the resistor $r_4$, the control winding 21, and the field winding 2 of the generator 1. With the latter relationship, the circuit connecting the field winding 2 to the electronic devices 11 and 12 may be considered self-exciting in the sense that its positive resistance is neutralized by an equivalent negative resistance resulting from the action of the electronic devices 11 and 12.

Inasmuch as the counter-electromotive force of any direct-current motor is proportional to the product of its speed and its effective field flux, it will be apparent that the magnetomotive force produced by the two windings 22 and 23 together, which is proportional to the counter-electromotive force of the motor 4, is also proportional to the speed of the latter motor as operated with constant excitation.

Figure 3:
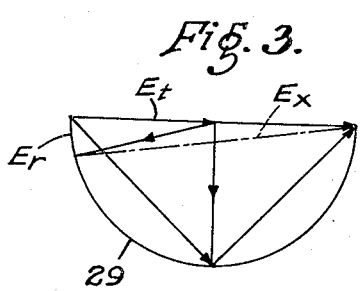
Fig. 3 is a vector diagram showing the relationship of alternating voltages in the excitation circuit of the electronic devices used in the system of Fig. 1.

The action of the excitation voltage winding 19 and the saturable reactor 20 in controlling the electronic devices 11 and 12 may be explained as follows: Referring to Fig. 3, the voltage across the excitation voltage winding is denoted by the vector $E_t$, and the resistance drop in the resistor 25 may be denoted by the vector $E_r$. The impedance drop in the alternating-current winding 24 may be denoted by the vector $E_x$. Inasmuch as the impedance drop in the alternating-current winding 24 consists almost entirely of inductive reactance voltage, the voltage component $E_x$ leads the voltage component $E_r$ by a phase angle of substantially 90° under all conditions. When the degree of saturation of the reactor 20 is varied, the reactance of the alternating-current winding 24 changes correspondingly, and the magnitude of the vector $E_x$ changes with reference to the magnitude of the vector $E_r$. However, as a phase-angle difference of 90° always exists between the vectors $E_r$ and $E_x$, and as their sum $E_t$ is constant, the locus of the vector junction point is a circle as shown at 29. As the two resistors 26 and 27 are connected to the mid-tap of excitation voltage winding 19 and to the junction point between the alternating-current winding 24 and the resistor 25, the voltage impressed upon them in series is equivalent to the radius of the circle 29 and is constant at all times. It will be seen, therefore, that a variation of the degree of saturation of the iron core 20a, produces a change in the phase angle of the voltages across the resistors 26 and 27, but no substantial change of magnitude of the latter voltages.

The junction point between the two equal resistors 26 and 27 is connected to the mid-tap of the cathode heating winding 18, thereby establishing the potential of the common junction point of these resistors as the average potential of the cathodes 14. The voltages impressed upon the control electrodes 15 are accordingly 180° out of phase with each other, considering the average potential of the cathodes 14 as the reference potential.

When the iron core 20a is in unsaturated condition, so that the maximum effective impedance of the alternating-current winding 24 is available, the phase angle of potentials applied to the control electrodes 15 is approximately 180° with reference to the anode potential of the corresponding electronic device 11 or 12. In this condition the electronic devices 11 and 12 are blocked that no discharge take place during either half cycle of supply voltage.

When the iron core 20a is saturated by the action of one or more of the windings 21, 22 and 23, the effective impedance of the alternating-current winding 24 is reduced, and the excitation voltage applied to the control electrodes 15 are rotated in phase position, thereby permitting discharge current to flow during a greater or less part of the half cycle when the voltage of the corresponding anode is positive with reference to the corresponding cathode.

As the two windings 22 and 23 together produce a magnetomotive force proportional to the speed of motor 4, which acts upon the core 20a, the latter two windings, with their associated apparatus, constitute a means responsive to the speed of motor 4 for varying the phase-angle point in the voltage of the alternating-current source 16 at which the electronic devices 11 and 12 become conducting. As the effect, in the iron core 20a, produced by the windings 21 and 22 together, is opposed by the effect produced by the winding 21, the saturable reactor 20 and its associated apparatus in the grid excitation circuits, may be regarded as a means differentially responsive to an effect dependent upon the speed of the motor 4 and an effect dependent upon the excitation of the generator 1 for varying the phase-angle point at which the electronic devices 11 and 12 become conducting.

Figure 2:
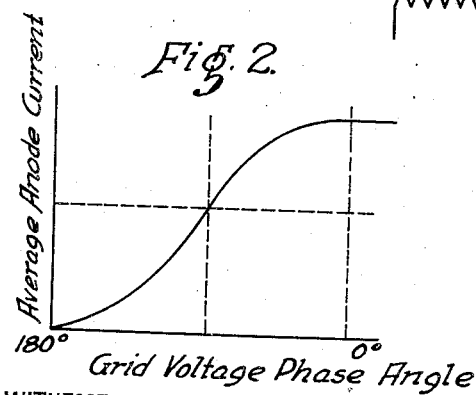
Fig. 2 is a curve showing the relationship of average anode current and phase angle of grid excitation, for an electronic device of the type used in the system of Fig. 1.

Referring to Fig. 2, the average anode current in one of the electronic devices 11 or 12 is plotted as ordinates against the phase angle of the excitation voltage applied to the control electrode 15 as abscissae, considering the phase angle of anode voltage as zero on the abscissa scale.

The operation of the apparatus as a whole may be set forth as follows: Assuming that the generator 1 is being driven at normal speed, and that the rheostatic control device $A_r$ has just been adjusted from open circuit position to the position shown, current commences to build up in the field winding 2, retarded by the inductive effect of the field winding. As the current in field winding 2 builds up, a proportionate magnetomotive force is established by the control winding 21 of the saturable reactor 20 and, as the latter magnetomotive force is not opposed to any magnetomotive force produced by the series type winding 22 or the shunt type winding 23, the reactor 20 saturates, thereby causing the effective reactance of the alternating-current winding 24 to fall to a low value. A heavy discharge current accordingly takes place through the electronic devices 11 and 12, and a voltage is impressed upon the Wheatstone bridge circuit 7 in such direction as to accelerate the building up of the current in the field winding 2.

As the current in field winding 2 builds up, the generator 1 develops a terminal voltage which causes the motor 4 to accelerate. As the motor 4 accelerates, its counter-electromotive force increases, and the series type winding 22 and the shunt type winding 23 together produce a magnetomotive force in opposition to that produced by the control winding 21.

As the speed of the motor 4 approaches the value corresponding to the setting of the rheostatic device $A_r$, the magnetomotive force developed by the series type winding 22 and the shunt type winding 23 together more and more nearly approaches the value of magnetomotive force produced by the control winding 21. The degree of saturation of the iron core 20a is accordingly reduced, and the anode current of the electronic devices 11 and 12 is correspondingly decreased. When the speed of the motor 4 exactly equals the value corresponding to the setting of the rheostatic device $A_r$, the total magnetomotive force in the iron core 20a becomes substantially zero, and the effective reactance of the alternating-current winding 24 rises to maximum value, thereby blocking further discharge current in the electronic devices 11 and 12.

By adjustment of the rheostatic device $A_r$ to positions other than that shown, the speed of the motor 4 may be raised or lowered as desired. At each position of the rheostatic device $A_r$, the speed of the motor 4 attains a final steady-state value, regardless of the direction or magnitude of motor load, such that the two electronic devices 11 and 12 are substantially blocked.

Fig. 4 shows a modification of my invention, in which the electronic devices 11 and 12 supply the entire current required by the field winding 2. In this modification, the saturable reactor 20 is provided with an additional winding 31, which introduces a component of magnetomotive force proportional to the setting of the rheotastic device $A_r$.

In this figure, in order to simplify the diagram, the four direct-current windings 21, 22, 23 and 31 of the saturable reactor 20 are shown disconnected on the core, in the lower left corner of the figure, and are shown elsewhere in their proper circuit relation.

Inasmuch as the direction of discharge current of the electronic devices 11 and 12 cannot be reversed, it is impossible to reverse the current in the generator field winding 2. I have accordingly provided an additional generator field winding 2a, which is energized continuously at a constant value by means of an excitation circuit including a resistor 32. The field winding 2a is designed to provide an average value of generator excitation such that the small value of reversed generator voltage required at minimum speed of the motor 4 with maximum overhauling motor load, may be obtained by merely de-energizing the main generator field winding 2 and permitting the reversed excitation produced by the additional winding 2a to determine the generator voltage.

The operation of the apparatus shown in Fig. 4 is otherwise similar to that described above in connection with Fig. 1, and will readily be understood from the description given above.

I do not intend that the present invention shall be restricted to the structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source; an electronic discharge device having an anode, a cathode and a control electrode, said anode and cathode being connected in a circuit with said source to said field winding, said electronic discharge device being of a type in which unidirectional discharge current flows upon energization of said control electrode to a predetermined degree when said anode is positive with reference to said cathode and continues until the instantaneous potential of said anode becomes approximately the same as that of said cathode; means for energizing said control electrode to said predetermined degree periodically at a predetermined phase-angle point in the voltage of said source; and means responsive to an operating characteristic of one of said dynamo-electric machines for varying said predetermined phase-angle point.

2. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; and means responsive to an operating characteristic of one of said dynamo-electric machines for varying said predetermined phase-angle point.

3. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; and means responsive to the speed of said machine operated as a motor for varying said predetermined phase-angle point.

4. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; a saturable inductive device having an alternating-current winding and a direct-current winding; an energizing circuit connecting said control electrode to said source through said inductive device, said energizing circuit being effective to vary the phase angle of energization of said control electrode as a function of current in said direct-current winding; and means responsive to an operating characteristic of one of said dynamo-electric machines for varying the degree of energization of said direct-current winding.

5. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; and means differentially responsive to an effect dependent upon the speed of said machine operated as a motor and an effect dependent upon the excitation of said machine driven at constant speed for varying said predetermined phase-angle point.

6. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; a source of electric power; speed control means for said machine operated as a motor; a triode-type electronic device having principal electrodes connected in circuit with said source and said field winding, said electronic device having a control electrode; and means differentially responsive to an effect dependent upon the speed of said machine operated as a motor and an effect dependent upon the setting of said speed control means for varying the effective energization of said control electrode.

7. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; a source of electric power; speed control means for said machine operated as a motor; a triode-type electronic device having principal electrodes connected in circuit with said source and said field winding, said electronic device having a control electrode; and variable-excitation means for varying the effective energization of said control electrode, said variable-excitation means being responsive to the resultant of an effect dependent upon the armature current of one of said machines, an effect dependent upon the voltage of one of said machines, and an effect dependent upon the setting of said speed control means.

8. In a direct-current motor-control system, first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; speed control means for said machine operated as a motor; and means differentially responsive to an effect dependent upon the speed of said machine operated as a motor and an effect dependent upon the setting of said speed control means for varying said predetermined phase-angle point.

9. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source, speed control means for said machine operated as a motor; and variable-excitation means for varying the effective energization of said control electrode, said variable-excitation means being responsive to the resultant of an effect dependent upon the armature current of one of said machines, an effect dependent upon the voltage of one of said machines, and an effect dependent upon the setting of said speed control means.

10. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; a source of electric power; speed control means for said machine operated as a motor; a triode-type electronic device having principal electrodes connected in circuit with said source and said field winding, said electronic device having a control electrode; and means differentially responsive to an effect dependent upon the speed of said machine operated as a motor and an effect dependent upon the current in said field winding for varying the effective energization of said control electrode.

11. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; a source of electric power; speed control means for said machine operated as a motor; a triode-type electronic device having principal electrodes connected in circuit with said source and said field winding, said electronic device having a control electrode; and variable-excitation means for varying the effective energization of said control electrode; said variable-excitation means being responsive to the resultant of an effect dependent upon the armature current of one of said machines, an effect dependent upon the voltage of one of said machines, and an effect dependent upon the current in said field winding.

12. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source; speed control means for said machine operated as a motor; and means differentially responsive to an effect dependent upon the speed of said machine operated as a motor and an effect dependent upon the current in said field winding for varying said predetermined phase-angle point.

13. In a direct-current motor-control system, a first dynamo-electric machine having an armature; a second dynamo-electric machine having an armature serially connected with said first-mentioned armature and having a field winding, one of said machines being driven at substantially constant speed with variable excitation, and the other of said machines being operated as a motor at variable speed; an alternating-current source, a unidirectionally-conducting gas-filled type electronic device having an anode, a cathode and a control electrode, said anode and cathode being connected in a circuit with said source to said field winding; means for periodically energizing said control electrode to effect cathode-anode conduction of said device at a predetermined phase-angle point in the voltage of said source, speed control means for said machine operated as a motor; and variable-excitation means for varying the effective energization of said control electrode, said variable-excitation means being responsive to the resultant of an effect dependent upon the armature current of one of said machines, an effect dependent upon the voltage of one of said machines, and an effect dependent upon the current in said field winding.

14. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; electronic regulating apparatus for varying a component of current in said field winding; control means for varying a component of current in said field winding; and means for preventing interchange of energy between said regulating apparatus and said control means.

15. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a divided energizing circuit for said field winding, said energizing circuit having a first branch and a second branch; electronic control apparatus included in said first branch; a control element included in said second branch; and means for preventing interchange of energy between said first branch and said second branch.

16. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a source of control current; resistance means; conducting means connecting said field winding, said resistance means and said source to form a divided circuit having said field winding in a first parallel branch, said resistance means in a second parallel branch and having the junctions of said first and second parallel branches connected to said source; and triode-type electronic regulating apparatus connected to be responsive to a variable operating characteristic of one of said dynamo-electric machines, said regulating apparatus including a cathode-anode circuit connected to said parallel branches in such relationship as to circulate an anode current component through said field winding but produce substantially no voltage difference between said junctions.

17. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; and electronic regulating apparatus for controlling an operating characteristic of one of said dynamo-electric machines, said regulating apparatus including principal electrodes and an electroresponsive element effective to vary the voltage between said principal electrodes; and conducting means connecting said field winding and said electroresponsive element to said principal electrodes in a self-exciting circuit, said self-exciting circuit having a total resistance substantially equal in ohms to the number of volts produced between said principal electrodes for each ampere of current in said electroresponsive element.

WILLIAM F. EAMES.